Aug. 8, 1950   G. FULTON   2,517,864
EYESHADE
Filed May 20, 1946
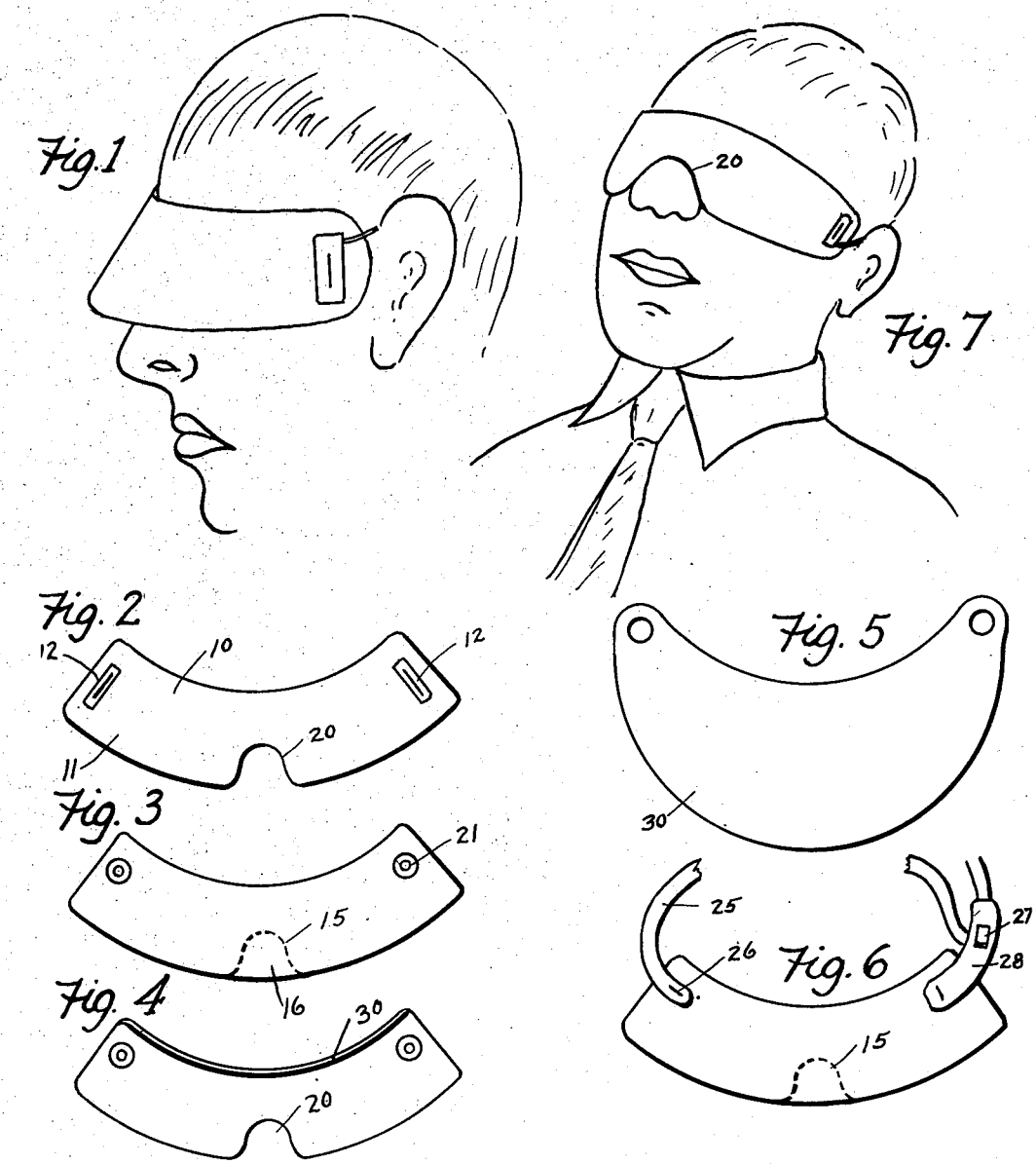
INVENTOR.
Garland Fulton
BY
Luther W Hawley Patented Aug. 8, 1950

2,517,864

UNITED STATES PATENT OFFICE 2,517,864

EYESHADE

Garland Fulton, Cynwyd, Pa.

Application May 20, 1946, Serial No. 671,027

2 Claims. (Cl. 2—12)

This invention relates to eye shades.

As is well known, eye shades are useful to protect the eyes and relieve eye strain under many different conditions and in many different situations. For instance, they may be used when driving, on buses, trains, at outdoor games, such as football and baseball games, etc.

This invention has for its salient object to provide a simple, practical and inexpensive all purpose eye shade.

Further objects of the invention will appear from the following specification taken in connection with the drawings which form a part of this application, and in which Fig. 1 is a perspective elevational view, partly broken away, showing an eye shade embodying the invention on the head of a wearer;

Fig. 2 is a plan view of an eye shade similar to that shown in Fig. 1 but slightly modified in construction;

Fig. 3 is a view similar to Fig. 2 but showing another modification of the invention;

Fig. 4 is a view similar to Fig. 2 but showing a slightly different form of attaching device;

Fig. 5 is a plan view similar to Fig. 2 but illustrating a modified shape of eye shade;

Fig. 6 is a view similar to Fig. 2 but illustrating a further modification of the attaching means; and Fig. 7 is a view similar to Fig. 1 but illustrating a modified form of eye shade.

The eye shade embodying the invention may be formed of any suitable material, such as paper, cardboard, stiffened cloth, cloth reinforced paper, or tinted cellophane material. The texture and opaqueness of the material should be chosen with care.

The eye shade consists of a strip of material having arcuate or curved inner and outer edges 10 and 11 and having at its ends suitable attachment means, such as flat disks or cleats 12, formed of stiff material, such as cardboard, around which an attaching cord, tape or string can be adjustably secured. The cord or tape is preferably elastic.

When the eye shade is used to shade the eyes from glare but the wearer desires to use his eyes, the shade is formed in the manner shown in Figs. 1, 3, 5 and 6. When used for this purpose the tape or cord is led from the upper edge of the attachment disk or strip 12, as shown in Fig. 1, in order to hold the upper edge 10 of the eye shade against the forehead.

However, in order to adapt the eye shade for the use shown in Fig. 1 and also for the use shown in Fig. 7, in which latter figure the shade entirely covers the eyes and keeps out the light, the edge 11 of the eye shade is provided, for instance, as shown in Figs. 3 and 6, with perforations or scoring 15 so formed that when the portion 16 enclosed by the perforations is removed, a notch will be formed to receive the bridge of the nose. In Figs. 2, 4 and 7, the notch is shown at 20.

When the eye shade is used in the manner shown in Fig. 7 to shut out the light and entirely cover the eyes, the attachment cord is led from the lower edge of the securing means 12, thus holding the outer edge or lower edge 11 against the face of the wearer.

In Figs. 3, 4 and 5, flat circular disks 21 attached by hollow rivets or grommets are provided for securing the ends of the cord or tape, but it should be understood that any desired securing means may be used, such as snap fasteners or hooks on the ends of the cord or tape, which engage slits in the eye shade. In Fig. 6 a tape 25 is attached at 26 to one end of the eye shade and is adjustably connected at 27 to an attaching member 28 at the other end of the eye shade.

In Fig. 5 the edge 30 of the eye shade is elongated to provide a wide visor particularly adapted for outdoor use.

If desired, the edge 10 of the eye shade may be taped or rolled or crimped in a manner similar to that shown at 30 in Fig. 4 to add to the comfort of the wearer.

It is contemplated that an inexpensive eye shade such as that above described may be handled through vending machines, either flat or rolled, and because of its cheapness the eye shade may be used for free distribution with advertising material thereon.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What I claim is:

1. An eye shade comprising a flat strip of material having curved inner and outer edges, means at the ends of the strip for attaching head-engaging means for supporting the shade in position on the head of a wearer and the outer curved edge of the strip having an arcuate weakened line midway the ends thereof providing a detachable tab whereby the eyes of the wearer may be shaded with the tab in the strip or entirely covered upon removal of the tab on the arcuate weakened line to form a nose-receiving notch.

2. An eye shade comprising a flat strip of material having curved inner and outer edges, means at the ends of the strip for attaching head-engaging means for supporting the shade in position on the head of a wearer, the outer curved edge of the strip having an arcuate weakened line midway the ends thereof providing a detachable tab whereby the eyes of the wearer may be shaded with the tab in the strip or entirely covered upon removal of the tab on the arcuate weakened line to form a nose-receiving notch, and the means at the end of the strip for attaching the head-engaging means including elongated cleats extending transversely of the strip with the head-engaging means selectively passing from the upper or lower end of the cleat to control the position of the outer edge of the strip relative to the face of the wearer.

GARLAND FULTON.

REFERENCES CITED

The following references are of record in the file of this patent:

UNITED STATES PATENTS

| Number | Name | Date |
| --- | --- | --- |
| 230,556 | Lancaster | July 27, 1880 |
| 662,518 | Barrett | Nov. 27, 1900 |
| 896,248 | Rogers | Aug. 18, 1908 |
| 1,599,576 | Mahony | Sept. 14, 1926 |
| 2,243,982 | Seeley | June 3, 1941 |